May 9, 1950     C. B. SCHNEIBLE     2,507,461
SEPARATION OF SOLIDS IN A MEDIUM

Original Filed April 24, 1941     2 Sheets-Sheet 2

Inventor:
Claude B. Schneible,
By: Dawson, Ooms & Booth,
Attorneys

Patented May 9, 1950

2,507,461

UNITED STATES PATENT OFFICE 2,507,461

SEPARATION OF SOLIDS IN A MEDIUM

Claude B. Schneible, Detroit, Mich.

Original application April 24, 1941, Serial No. 390,073. Divided and this application January 29, 1945, Serial No. 575,142

2 Claims. (Cl. 183—77)

This invention relates to the separation of solids in a medium, and more particularly to a method and apparatus for separating or recovering solids from a medium. It is particularly useful in treating a gaseous medium. The method and apparatus are also particularly well adapted for treating a hot gaseous medium, such as heated gases flowing from the stack of a cupola, blast furnace, cement furnace, etc.

An object of the invention is to provide simple and effective apparatus and means for treating solids-laden mediums for the rapid separation of the solids from the main body of the mediums. A further object is to provide a method and means for treating heated gases to remove solids therefrom. A further object is to provide means whereby hot gases containing solids may be treated by filtering. Other specific objects and advantages will appear as the specification proceeds.

Figure 1:
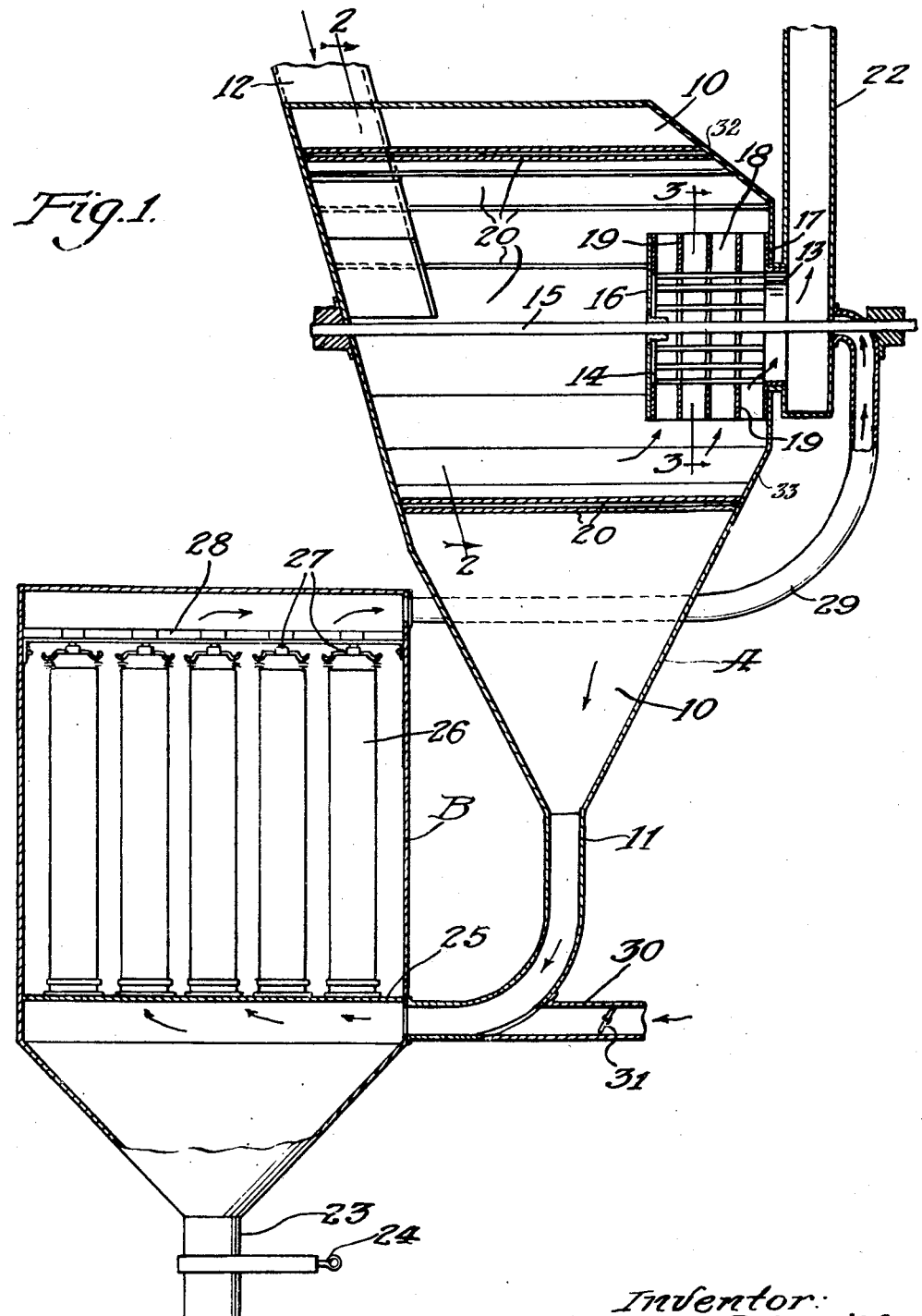
Figure 2:
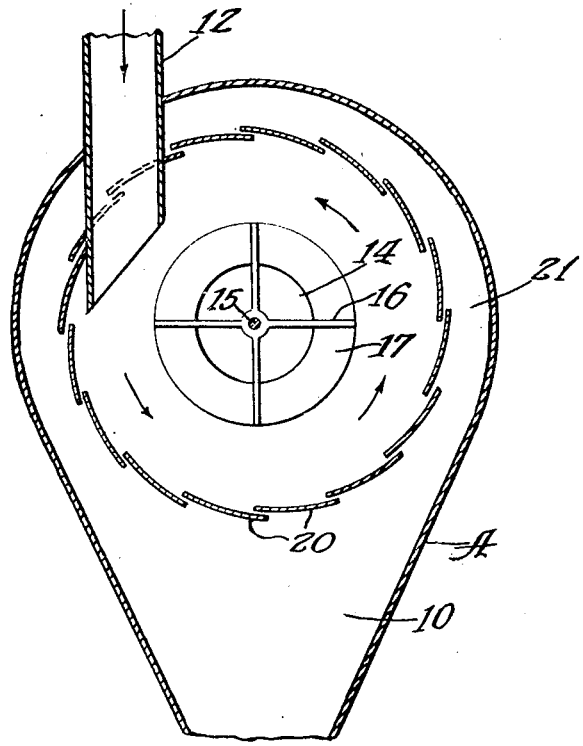
Figure 3:
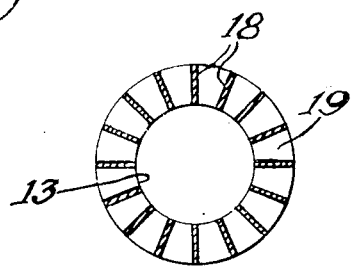

The invention is illustrated in the accompanying drawing, in which Fig. 1 is a vertical sectional view of the device of the invention; Fig. 2 is a transverse sectional view taken along the line 2—2 of Fig. 1; and Fig. 3 is a transverse sectional view taken along the line 3—3 of Fig. 1.

In the illustration given, A designates a separator apparatus for the removal of solids from the main body of the medium; and B, a filtering apparatus.

The apparatus A may be of any suitable construction or shape. While I have shown a casing of a certain shape, it will be understood that wide variations may be made therein while still using the features of the invention which will be pointed out. In the illustration given, the casing A provides a large closed chamber 10 which tapers toward a restricted outlet 11 at the bottom thereof. The outlet 11 is designed to receive medium which is heavily ladened with solids and in which the solids have been concentrated in the chamber 10.

An inlet 12 is provided in the upper portion of the casing and it opens tangentially within the central portion of the chamber. Along one side of the chamber is shown an outlet 13 through which medium, which has been to a great extent separated from the solids, is withdrawn. As a guard for the medium, I provide a refuser wheel 14, which is mounted upon shaft 15. The shaft 15 is driven by any suitable source of power (not shown).

The refuser wheel may be of any suitable construction designed for the throwing outwardly of solid particles while at the same time permitting the inflow of medium freed from solids therethrough and into the outlet 13. The preferred form of refuser wheel, as shown, consists of a solid front of outer plate 16 and a centrally-apertured rear plate 17. Spaced between the plates 16 and 17 and parallel therewith are a number of radial vanes 19. Transverse radial vanes 18 extend between the radial vanes 19 and also between the front and rear plates 16 and 17 and the adjacent radial vanes 19. With this construction, the front and rear plates and the vanes 18 and 19 provide radial channels through which the gaseous medium may flow inwardly from the periphery of the wheel. The central aperture in the rear plate 17 is in alignment with and communicates with the outlet 13 so that the gaseous medium which passes radially inwardly from the periphery of the wheel through the channels provided by the vanes 18 and 19 and front and rear plates 16 and 17 flows directly into the outlet 13.

With the refuser wheel construction shown and described herein, the gaseous medium may not enter through the front or outer end of the refuser wheel since this is closed by the plate 16. Instead, the flow of the gaseous medium is radially inwardly from the periphery of the wheel to the central portion thereof and thence to the outlet 13. With this construction, the wheel when rotated tends to refuse and throw outwardly the solid particles carried by the gaseous medium. The medium which does pass through the wheel to the outlet 13 is therefore relatively free of solid particles.

It will be understood that a rotating annulus of medium, substantially parallel with the refuser wheel 14, is produced within the casing, as indicated by arrows in Fig. 2. This annulus may be produced by the refuser wheel alone or by the refuser wheel in conjunction with the tangential inlet 12. It will be understood, however, that the inlet 12 need not be tangential because the force of the refuser wheel itself is sufficient to produce the annulus of air.

Within the casing 10 and around the periphery of the refuser wheel are skimmer louvers 20. These louvers are preferably substantially equidistantly spaced from the periphery of the wheel and uniformly disposed about the wheel, as seen particularly in Fig. 2. The skimmer louvers should be in radial alignment with the periphery of the wheel so that the annulus of medium created by the wheel and extending about the periphery thereof is brought into contact at its outer peripheral portion with the skimmer louvers. The outer peripheral portion of the rotating annulus of medium contains a relatively large proportion of the heavy particles of solids suspended in the medium, and also contains a relatively large number of particles of solids. The skimmer louvers serve to permit the particles of solids, together with the medium in which they are suspended, to pass beyond the louvers into the outer portion of the chamber 10. In effect, the medium which is heavily ladened with solid particles is skimmed from the outer peripheral portion of the rotating annulus of medium and passes beyond the louvers. The gaseous medium which does not contain such a large proportion of particles or such heavy particles of solids is not to any great extent thrown to the outer periphery of the rotating annulus of medium, and even such portions as are thrown to this outer periphery of the rotating annulus of medium are not as readily skimmed by the louvers. The suction in the conduit 22 tends to draw the lighter portions of the medium radially inwardly into and through the refuser wheel. In this manner, the louvers cooperate with the refuser wheel and the rotating annulus of medium created thereby to separate the relatively heavily solids-ladened portion of medium from the lighter portions of medium.

It will be understood that communicating with the outlet 13 of casing A, there is a suction passage 22 communicating with any suitable source of suction (not shown). Under the influence of suction within this passage, medium is drawn toward the outlet 13, but due to the rotation of the guard or refuser wheel 14, only the lighter portion of the medium, which is freed from the solids, is able to escape through the outlet.

As illustrated, the portion of the casing 10 about the refuser wheel is provided with tapered walls 32 and 33 which extend respectively upwardly and forwardly, and downwardly and forwardly. This tapering of the walls to provide a modified conical-shaped housing about the periphery of the refuser wheel is helpful in that the air immediately adjacent the wall of the housing contains a maximum quantity of solid particles per unit volume of air, and also travels at lower velocity than the air in the central portion of the housing.

The filtering apparatus B may be of any suitable construction. If desired, apparatus like that shown in my Patent No. 2,014,298 may be employed. It will be understood, however, that it is not necessary that any particular form of filtering bag or means be used. The apparatus B consists of a casing providing a chamber, the bottom portion of which is tapered to provide an outlet 23. A closure valve 24 controls the withdrawal of solids. A head plate 25 extends across an intermediate portion of the casing, the head being provided with openings communicating with the interior of cloth filter bags 26. The filter bags are secured about the plate 25 and at the top are suspended upon spring supports 27 similar to those shown in my Patent No. 2,014,298, the spring supports 27 in turn being carried by a cross beam structure 28. A return pipe 29 establishes communication between the upper portion of the casing B and the suction pipe 22.

In order to cool the heated gases passing out of chamber 10, I provide means for introducing fresh or cooled air into the withdrawn material. If desired, the heated gases may be brought into contact with the cooling air for a distance sufficient to produce a thorough mixing thereof and a cooling of the heated gases. For the purpose of illustration, I show an inlet pipe 30 controlled by a damper 31 through which a cooling medium is introduced into the withdrawn gaseous medium.

Any suitable means for creating a suction in the upper portion of casing B may be employed. For the purpose of simplicity in structure and also for enabling all the medium to be recovered at one place, the connecting pipe 29 is employed for leading the filtered medium back to the suction pipe 22.

It will be understood that means for shaking the filter bags to produce removal of solids and any other desirable means for use in connection with the filtering of the medium, may be employed.

Operation

In the operation of the device, the medium, which may be hot or at any temperature, is introduced into the main casing A and under the influence of the refuser wheel 14 forms a rotating annulus within the skimmer louvers 20. The medium is drawn toward the outlet 13 by means of the suction within pipe 22. The admission of solids, however, is resisted by the refuser wheel 14, which tends to throw out the solid particles, allowing only the lighter medium substantially free of solids to pass through outlet 13.

The rotating annulus of gaseous medium about the periphery of the refuser wheel 14 is in contact at its outer peripheral portion with the skimmer louvers 20. The skimmer louvers 20 operate to remove and eliminate the heavier portions of the medium, thereby concentrating the solids more and more within the outer passage 21 of the casing 10. The medium in the outer passage 21 of the casing 10 containing a relatively large quantity of solids by reason of the reduced velocity of the medium tends to move downwardly toward the discharge outlet 11.

The gaseous medium heavily ladened with solid particles passes to the filtering apparatus B. In the treatment of the heated medium, cool air is introduced through the inlet 30 in sufficient volume to cool the gases to a temperature which will not cause injury to the filtering bags 26. The cooled gases pass through the bags 26 and then are returned through conduit 29 to the outlet 22, while the solids are collected and removed through the outlet 23.

This application is a division of U. S. application Serial No. 390,073, for Separation of solids in a medium, which has matured into Patent No. 2,368,263.

While I have shown one complete arrangement by which a complete treating operation can be carried out, it will be understood that the invention applies to separate operations and apparatus and that such separate steps and apparatus may be used in entirely different arrangements and in conjunction with other apparatus. The foregoing description has been given for the purpose of illustration and it will be understood that those skilled in the art may readily modify the details and steps therein without departing from the spirit of my invention.

I claim:

1. In apparatus for recovering solids from a gaseous medium in which they are carried, a casing providing a chamber having an outlet on one side and an outlet in the bottom thereof, a refuser wheel mounted with its outlet in alignment with the outlet in the side of the casing, means for rotating said refuser wheel to produce a rotating annulus of medium about the periphery of the wheel, and inwardly thereof in the chamber, said refuser wheel extending over less than one-half the width of said chamber, skimmer louvers extending about said refuser wheel in spaced relation therefrom and all the way across said chamber, said skimmer louvers being separated from each other by narrow openings and lying adjacent the outer portion of said rotating annulus for skimming the heavy portion of the solids-medium, and an inlet pipe extending into the side of the chamber opposite said refuser wheel and discharging a gaseous medium containing solids into the central portions of said chamber opposite said refuser wheel.

2. In apparatus for recovering solids from a gaseous medium in which they are carried, a casing providing a chamber having two outlets, one outlet being in one side of the casing and the other being in the bottom of the casing, skimmer louvers extending across said chamber to form an annular frame thereabout, said skimmer louvers being separated from each other by narrow openings, a refuser wheel mounted in one side of said chamber with its outlet in alignment with said outlet opening in the side of the casing, said refuser wheel having a width less than one-half that of the chamber, means for rotating said refuser wheel to produce a rotating annulus of medium extending across said chamber and with the outer portion thereof skimmed by said skimmer louvers, and an inlet pipe extending through said skimmer louvers, and opening into the central portion of the chamber opposite said refuser wheel.

CLAUDE B. SCHNEIBLE.

REFERENCES CITED

The following references are of record in the file of this patent:

UNITED STATES PATENTS

| Number | Name | Date |
|---|---|---|
| 10,696 | Jones | Mar. 28, 1854 |
| 419,316 | Case | Jan. 14, 1890 |
| 845,044 | Baldwin | Feb. 26, 1907 |
| 911,802 | Baldwin | Feb. 9, 1909 |
| 1,899,794 | Coupard | Feb. 28, 1933 |
| 1,928,702 | O'Mara | Oct. 3, 1933 |
| 2,367,906 | Wall et al. | Jan. 23, 1945 |
| 2,368,263 | Schneible | Jan. 30, 1945 |

FOREIGN PATENTS

| Number | Country | Date |
|---|---|---|
| 257,121 | Great Britain | Aug. 19, 1926 |